US009056537B2

(12) United States Patent
Eberling

(10) Patent No.: US 9,056,537 B2
(45) Date of Patent: Jun. 16, 2015

(54) METHOD TO REDUCE LOAD TRANSFER BETWEEN AXLES OF A COMMON SET DURING BRAKING

(71) Applicant: Charles E. Eberling, Wellington, OH (US)

(72) Inventor: Charles E. Eberling, Wellington, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 162 days.

(21) Appl. No.: 13/852,698

(22) Filed: Mar. 28, 2013

(65) Prior Publication Data
US 2014/0297118 A1  Oct. 2, 2014

(51) Int. Cl.
B60G 17/0195 (2006.01)
B60G 17/005 (2006.01)
B60G 17/015 (2006.01)

(52) U.S. Cl.
CPC .......... B60G 17/0195 (2013.01); B60G 17/005 (2013.01); B60G 17/0155 (2013.01); B60G 17/0152 (2013.01); B60G 2400/10 (2013.01); B60G 2400/208 (2013.01); B60G 2400/30 (2013.01); B60G 2400/37 (2013.01); B60G 2400/39 (2013.01); B60G 2400/60 (2013.01); B60G 2500/20 (2013.01)

(58) Field of Classification Search
CPC ............... B60G 2800/915; B60G 17/0164; B60G 17/0523; B60G 2400/106; B60G 2500/202; B60G 2500/204; B60G 2800/22; B60G 2800/912; B60G 17/0195; B60G 2400/10; B60G 2400/208; B60G 2400/30; B60G 2400/37; B60G 2400/39; B60G 2400/60; B60G 2500/20; B60G 17/005; B60G 17/0152; B60G 17/0155; B60T 13/683

USPC ................................................ 701/37, 38, 48
See application file for complete search history.

(56) References Cited

U.S. PATENT DOCUMENTS

| | | | |
|---|---|---|---|
| 3,877,715 A | | 4/1975 | Thayer et al. |
| 3,920,283 A * | | 11/1975 | Strader .......................... 303/198 |
| 4,685,745 A * | | 8/1987 | Reinecke ....................... 303/191 |
| 4,686,626 A * | | 8/1987 | Kuroki et al. ................... 701/70 |
| 4,795,219 A * | | 1/1989 | Brearley et al. .............. 303/9.69 |
| 5,052,713 A | | 10/1991 | Corey et al. |
| 5,692,587 A * | | 12/1997 | Fratini, Jr. .................. 188/266.2 |
| 5,718,446 A * | | 2/1998 | Fuchida ................. 280/124.157 |
| 6,247,564 B1 * | | 6/2001 | Kim .............................. 188/300 |
| 6,523,625 B2 * | | 2/2003 | Eberling et al. ........... 180/24.02 |
| 6,808,035 B1 | | 10/2004 | Keeler |
| 6,935,625 B2 * | | 8/2005 | Bolt et al. .................. 267/64.16 |
| 7,051,851 B2 * | | 5/2006 | Svartz et al. .................. 188/300 |
| 7,484,603 B2 * | | 2/2009 | Fox .............................. 188/275 |
| 7,740,257 B2 | | 6/2010 | Haire |
| 7,841,608 B2 | | 11/2010 | Morris et al. |
| 2003/0045989 A1 * | | 3/2003 | Walenty et al. ................. 701/71 |
| 2005/0206231 A1 * | | 9/2005 | Lu et al. ........................ 303/146 |
| 2008/0183353 A1 * | | 7/2008 | Post et al. ....................... 701/42 |
| 2008/0221756 A1 | | 9/2008 | Miskin |

* cited by examiner

Primary Examiner — Jason Holloway
(74) Attorney, Agent, or Firm — Fay Sharpe LLP

(57) ABSTRACT

When a vehicle decelerates quickly or otherwise experiences a hard brake event, the described systems and methods facilitate reducing load transfer between axles of a common set of axles (e.g. a tandem axle, a tridem axle, etc.). Transfer of suspension pressure from a dynamically unloaded axle to a more loaded axle is limited by a suspension control component such as a valve or solenoid or the like that closes upon detection of a hard brake event in order to lock air in the suspension components of the respective axles. This in turn limits the dynamically unloaded axle from lifting, thereby permitting it to contribute more significantly to the braking effort and improving stopping distance.

21 Claims, 3 Drawing Sheets

METHOD TO REDUCE LOAD TRANSFER BETWEEN AXLES OF A COMMON SET DURING BRAKING

BACKGROUND

The present application finds particular application in vehicle brake systems, particularly involving multiple axle brake systems. However, it will be appreciated that the described techniques may also find application in other brake systems, other vehicle systems, or the like.

In multi-axle suspension systems, much brake effectiveness is lost to dynamic load transfer between the axles of a common set (i.e., tandem or double axle sets, tridem or triple axle sets, etc.). When load is transferred, the dynamically unloaded axle is prevented from contributing significantly to the brake retardation effort.

The present innovation provides new and improved systems and methods that facilitate limiting load transfer from a dynamically unloaded axle to a more loaded axle in a common set during a hard braking event, which overcome the above-referenced problems and others.

SUMMARY

In accordance with one aspect, a method for reducing load transfer between axles of a common set during braking comprises identifying a preset hard brake threshold for a vehicle, and determining a load on at least one axle of the vehicle. The method further comprises detecting a hard brake event, and sending a command to a wheel suspension control component (SCC) to limit transfer of suspension pressure from a dynamically unloaded axle to a more loaded axle.

In accordance with another aspect, a processor that reduces load transfer between axles of a common set during braking is configured to identify a preset hard brake threshold for a vehicle, and determine a load on at least one axle or axle set of the vehicle. The processor is further configured to detect a hard brake event, and send a command to a wheel suspension control component (SCC) to limit transfer of suspension load from a dynamically unloaded axle to a more loaded axle. The axles, in one example, start out being equally loaded.

According to another aspect, a system that facilitates reducing load transfer between axles of a common set of axles on a vehicle during a hard brake event comprises a suspension control component configured to control one or more suspension components during the hard brake event, and a processor configured to identify a preset hard brake threshold for the vehicle, and determine a load on at least one axle or axle set of the vehicle. The processor is further configured to detect a hard brake event, and send a command to a wheel suspension control component (SCC) to limit transfer of suspension pressure from a dynamically unloaded axle to a more loaded axle.

In accordance with another aspect, an apparatus for reducing load transfer between axles of a common set during braking comprises identification means for identifying a preset hard brake threshold for a vehicle, and sensing means for determining a load on at least one axle or axle set of the vehicle. The apparatus further comprises detection means for detecting a hard brake event control means for sending a command to a wheel suspension control component (SCC) to limit transfer of suspension pressure from a dynamically unloaded axle to a more loaded axle.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which reduce the load transfer between the axles of a tandem axle upon detection of a hard brake event. One aspect of this innovation thus relates to using the antilock brake system (ABS) electronic control unit (ECU) to monitor for high deceleration events and then limiting transfer of suspension air between multi-rear axles to improve braking force at each axle.

Most tandem suspensions dramatically unload one of the rear drive axles during hard braking. This results in the dynamically unloaded axle not being able to contribute its share to the braking effort due to adhesion limits caused by reduced loading, thereby resulting in excessive axle cycling which in turn prevents maximizing the braking potential of the dynamically unloaded axle. The described systems and methods isolate the load carried by each of the axles of the set during hard braking.

Figure 1:
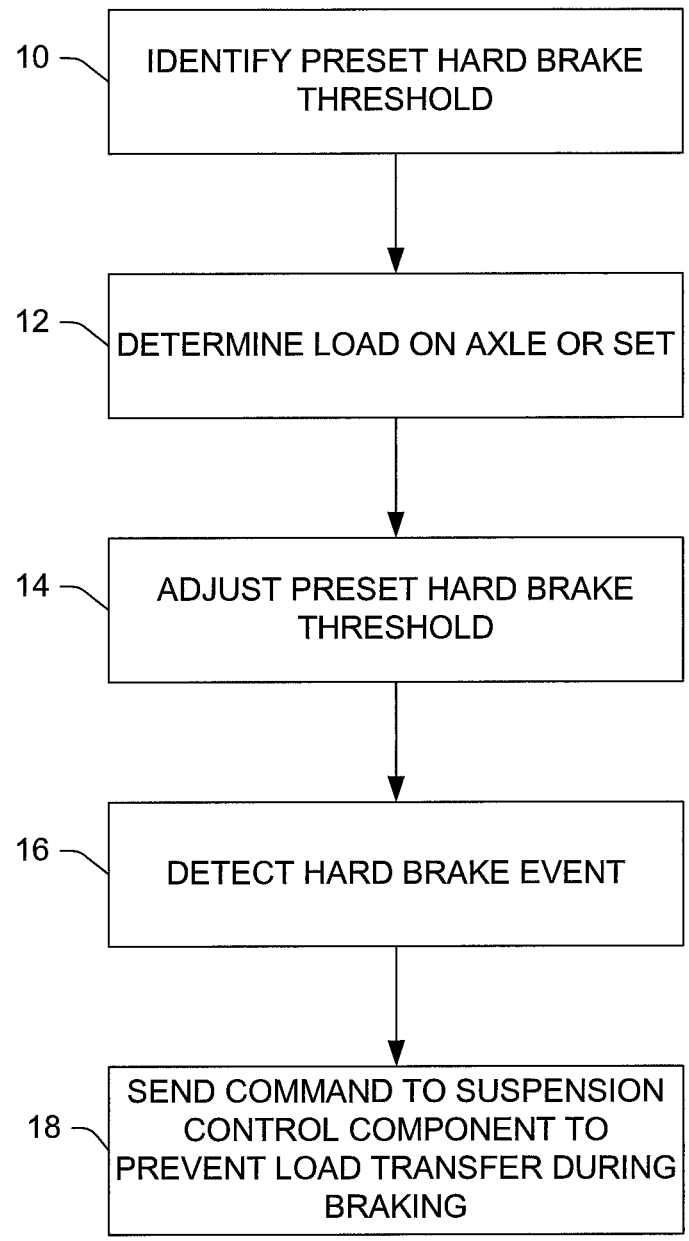
FIG. 1 illustrates a method for limiting load transfer between axles of the common set during a hard brake event, in accordance with one or more aspects described herein.

FIG. 1 illustrates a method for preventing load transfer between axles of the common set during a hard brake event, in accordance with one or more aspects described herein. "Common set" as used herein denotes a multi-axle arrangement (e.g. a tandem or double axle, and tridem or triple axle, etc.) comprising multiple axles such as are employed on truck or a trailer or the like. The tandem axle (or other multi-axle set) generally shares an air source for air suspension equipped vehicles. It is desirable during hard brake event to prevent the transfer of load from a dynamically unloaded axle to a more loaded axle, so that the dynamically unloaded axle does not have its braking contribution diminished. The transfer of suspension pressure from the more lightly loaded axle to the more heavily loaded axle, according to one embodiment, is prevented using pneumatic valves. In another embodiment, the transfer of suspension pressure from the more lightly loaded axle to the more heavily loaded axle is prevented using electro-pneumatic valves. The valves can be controlled by the antilock brake system (ABS) electronic control unit (ECU) to prevent air pressure transfer when the ECU detects a hard brake event. The described systems and methods facilitate maintaining braking power at the less-loaded axle, which can then contribute more efficiently to the braking effort.

Accordingly, at 10, a preset hard brake threshold is identified. The hard brake threshold may be stored in memory a priori, received over a communication link, or identified in any other suitable manner. According to one example, the preset hard brake threshold is a deceleration threshold value (e.g., a deceleration of about 0.2 g, or some other suitable predetermined deceleration rate), and detecting the hard brake event further comprises determining that the vehicle is decelerating at a rate greater than the deceleration threshold value. In another example, the hard brake threshold is a pressure threshold value. For instance, the pressure threshold value can be a pressure value that triggers a stop lamp switch on the vehicle when the driver depresses the brake pedal. Detecting a hard brake event can then comprise determining that an amount of pressure applied the brake pedal is greater than the pressure threshold value, and/or detecting stop lamp switch input or trigger signal.

At 12, a load (e.g. weight) on one or more axles of the common set and/or the vehicle is determined. In one embodiment, the load on a single axle is determined. In another embodiment the load across a common set (e.g. a double or triple axle or the like) is determined. In another embodiment the total vehicle load is determined by summing the load on all axles of the vehicle. Axle load can be determined, for example, via one or more sensors or scales on each axle or wheel or by the air bag suspension pressure sensors. At 14, the preset hard brake threshold is adjusted as a function of the load determined for the one or more axles or axle set. The preset hard brake threshold is adjusted if pressure is the threshold. If deceleration is used as the threshold, the threshold does not change as a function of the load. The smaller the load on the axle or vehicle, the lower the hard brake threshold is set. At 16, a hard brake event is detected by comparing a detected event (e.g., brake pedal pressure, stop signal input, deceleration, etc.) to the hard brake threshold. At 18, a command is sent to a suspension control component to prevent load transfer during the hard brake event. That is, load transfer from a dynamically unloaded axle to a more loaded axle is inhibited in response to the command.

In one embodiment, the command comprises an instruction to the suspension control component and/or the suspension components themselves to maintain a current amount of rigidity in at least one controlled suspension component. For instance, the suspension control component can be a valve (e.g. a pneumatic valve, and electro-pneumatic valve, etc.) that closes in response to the command thereby locking air in the suspension component (e.g., airbags, shock absorbers, etc.) on the dynamically unloaded axle, which in turn maintains rigidity of the suspension component on the dynamically unloaded axle in order to maintain a desired amount of adhesion between wheels on the dynamically unloaded axle and the road. That is, by locking the suspension component to maintain or increase the rigidity or stiffness as existed prior to the hard braking event, the dynamically unloaded axle is prevented from lifting and/or transferring load to the more loaded axle during hard brake event.

In another embodiment, the controlled suspension component comprises one or more variable rate shock absorbers, wherein the command instructs the one or more variable rate shock absorbers to increase an amount of downward force applied to the dynamically unloaded axle in order to further improve adhesion and prevent load transfer to the more loaded axle. In yet another embodiment, the at least one axle is a steering axle, and the controlled suspension component comprises one or more dampened shocks.

Figure 2:
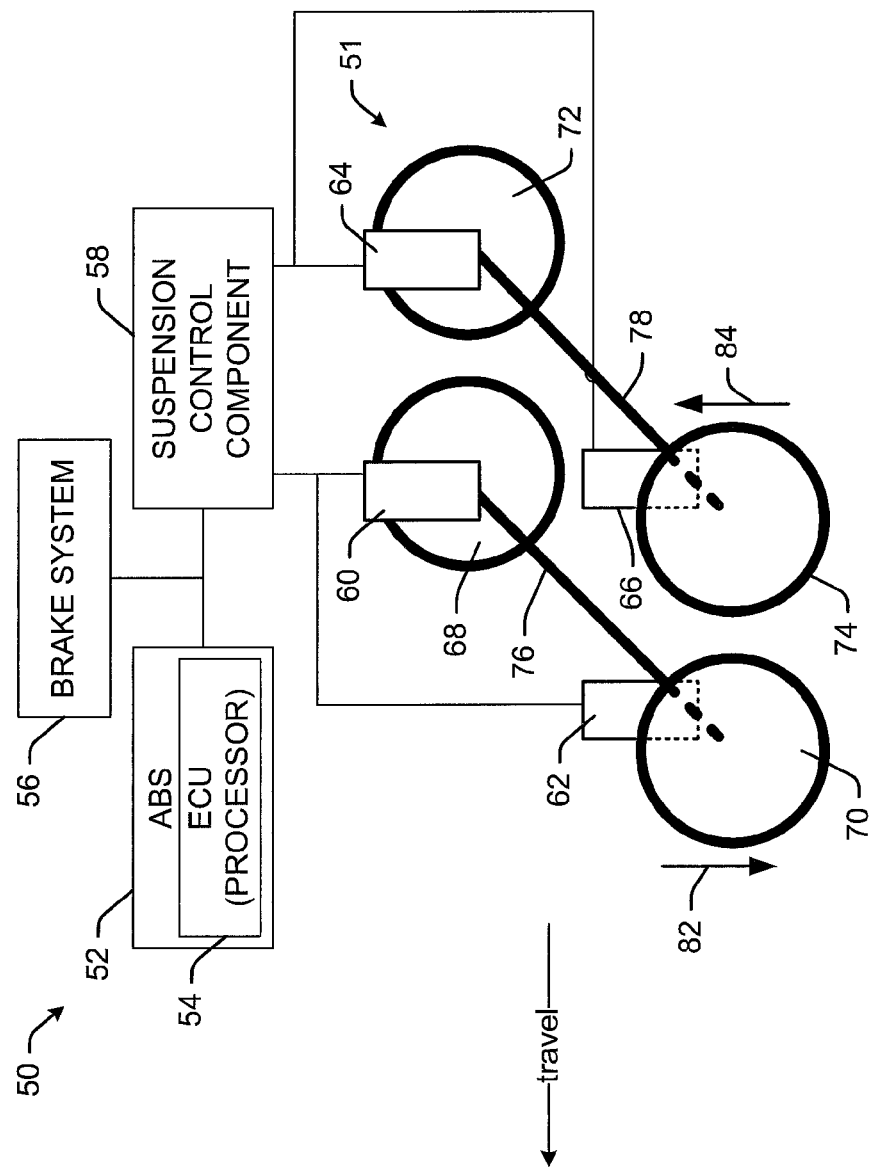
FIG. 2 illustrates a system that facilitates limiting load transfer between axles of a common set during a hard brake event, in accordance with one or more features described herein.

FIG. 2 illustrates a system 50 that facilitates preventing load transfer between axles of a common set 51 during a hard brake event, in accordance with one or more features described herein. The system comprises an antilock brake system (ABS) 52 that includes an electronic control unit (i.e., a processor) 54 and is operatively coupled to a brake system 56 and a suspension control component 58 (e.g. a pneumatic valve, and electro-pneumatic valve, or some other means for controlling a plurality of suspension components). The suspension control component is pneumatically coupled to a plurality of suspension components 60, 62, 64, 66. It will be appreciated that although the suspension components are depicted on the respective axles, the suspension components are part of a suspension system, such as an air suspension system in which the suspension components (e.g., air springs, airbags, shocks, etc.) are offset from the axle and/or mounted to a suspension frame or structure that is coupled to the vehicle frame and to a vehicle axle.

Suspension component 60 provides suspension for a forward right side wheel 68, suspension components 62 provides suspension for a forward left side wheel 70, suspension components 64 provides suspension for a rear right side wheel 72, and suspension component 66 provides suspension for a rear left side wheel 74. Forward wheels 68 and 70 are coupled by forward axle 76, and rear wheels 72 and 74 are coupled by a rear axle 78. During hard brake event, a downward force 82 is exerted on the forward axle 76 as momentum transfers load forward from the rear axle 78, which experiences an upward force 84 during deceleration.

In order to limit load transfer from the rear axle 78 to the forward axle 76 during a hard brake event, the suspension control component is positioned between the suspension components 60, 62 of the front axle 76 and the suspension components 64 and 66 of the rear axle 78. In another example, load transfer is limited from front to rear. For instance, axle load transfer due to the flow of air suspension pressure can be minimized with isolation. In one embodiment, the suspension control component 58 is a valve or solenoid that is normally open, but closes upon receipt of a command from the ABS ECU 54 triggered by a detected hard brake event. In response to the command, the suspension control component closes, thereby pneumatically isolating the forward suspension components 60, 62 from the rear suspension components 64, 66 on the common set 51, thereby prohibiting airflow there between. In one embodiment, the suspension components are air springs, and air is locked in the rear suspension components 64, 66 so that downward force is maintained in order to mitigate adhesion loss that can be caused by the upward force 84 experienced by the reward axle 78 during the hard brake event.

In another embodiment, the suspension components are variable rate shock absorbers. Electronically controlled variably dampened shock absorbers provide increased dampening, controlled by the ABS ECU and/or the suspension control component by sending a command to the rear suspension components 64, 66 to maintain or increase downward force in order to counteract the upward force 88 experienced by the rearward axle 78 due to load transfer during the hard stop.

In order to keep the suspension and optimal pressures, force or load on each axle during low-speed maneuvering, the system can be activated upon the vehicle speed exceeding a predetermined speed threshold (e.g., greater than 10 mph or some other predetermined speed threshold). In another embodiment, the system is activated once the vehicle speed has exceeded the predetermined speed threshold and additionally upon detection by the ABS ECU 54 of a stop lamp switch input received at the brake system 56. The stop lamp switch can be used to indicate to the system that it may have to start control (e.g., a wake up function), but the threshold trigger is the deceleration or the pressure at the brake pedal. In the variable shock absorber example, the control starts at pressures low enough to engage the stop lamp switch (e.g., about 5 psi) and the variable shock absorber begins to increase rigidity.

The pressure at the brake pedal is, e.g., between about 20 psi and 80 psi in this example for the system to enter into control mode. The rate of change of the pressure at the brake pedal can also be an indicator that suspension control mode should be entered. That is, when the driver applies sufficient pressure to the brake pedal, of for instance about between 20 psi and 80 psi, used as a trigger to send a command the suspension control component to limit load transfer as described herein.

According to various features described herein, the system reduces dynamic load transfer between the axles of a multi-axle common set having N axles, where N is at least 2, (e.g. a tandem or tridem set or the like) during higher deceleration rates. Dynamic load transfer is inhibited by limiting the transfer of suspension pressure of an air suspension arrangement using pure pneumatic or electro-pneumatic valves or by increasing shock dampening in one or more of steel sprung and air sprung suspensions during hard braking. In this manner, the system provides better dynamic load distribution on an axle set during hard braking by providing additional shock dampening and preventing significant load transfer. Variable shock absorber dampening or isolation of the airbag pressures via additional control valving reduces the amount of load transferred across the axle set. In this manner, the system 50 limits or limits load transfer across the axles of a common set such as a rear tandem to prevent premature wheel lock due to dynamic axle unloading between the two axles during hard braking. In one embodiment, this is accomplished with an air suspension isolation valve or variable shock dampening controlled by the ABS ECU or by brake application pressure. In another embodiment, active suspensions are used to address the large load distribution variances during higher decelerations.

Figure 3:
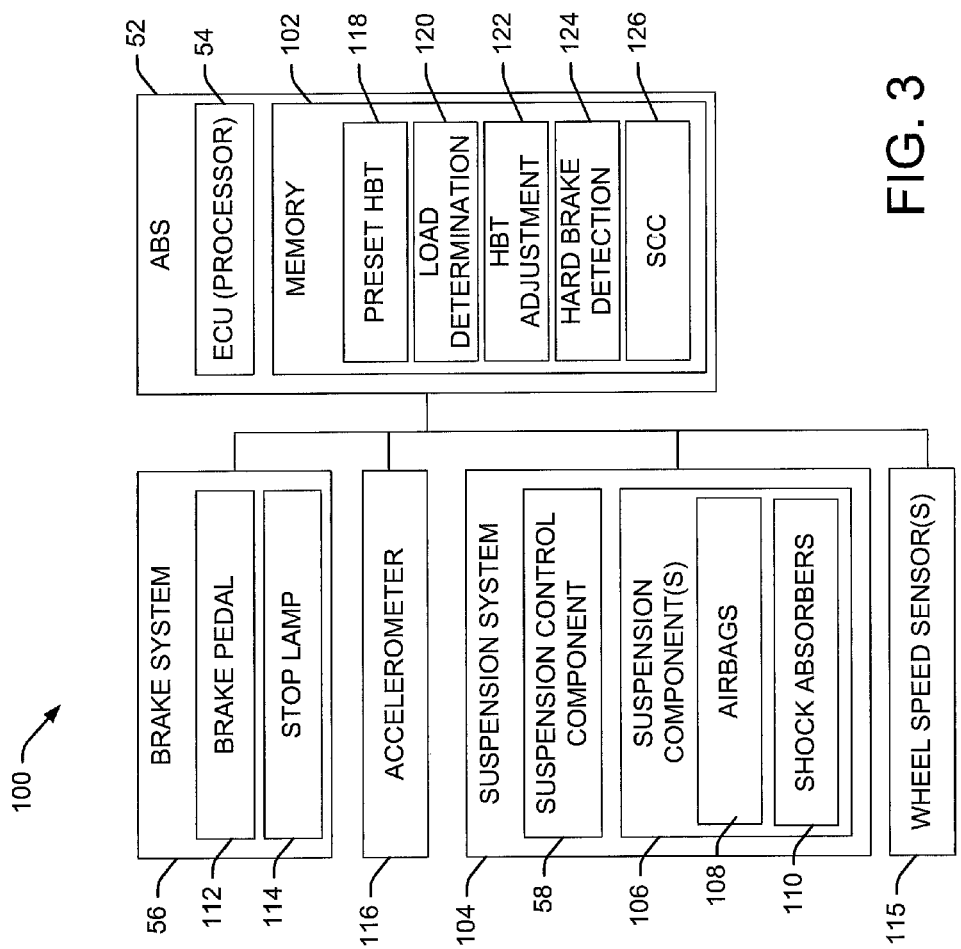
FIG. 3 illustrates a system that facilitates reducing load transfer between axles and a common set during a hard brake event, in accordance with one or more features described herein.

FIG. 3 illustrates a system 100 that facilitates reducing load transfer between axles and a common set during hard brake event, in accordance with one or more features described herein. The system comprises the ABS component 52 with the ECU processor 54 that executes, and a memory 102 that stores, computer-executable instructions (e.g., modules, routines, programs, applications, etc.) for performing the various methods, techniques, protocols, etc., described herein.

The memory 102 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 54. Additionally, "module," as used herein denotes a set of computer-executable instructions (e.g., a routine, sub-routine, program, application, or the like) that is persistently stored on the computer-readable medium or memory for execution by the processor, and/or a processor configured to execute the instructions to provide the described function.

The ABS system is operatively coupled to the brake system 56 and a suspension system 104 that comprises the suspension control component 58. The suspension system further comprises a plurality of suspension components 106 (which may be similar or identical to the suspension components 60, 62, 64, 68 of FIG. 2). In one embodiment the suspension components 106 include a plurality of air springs 108. In another embodiment, the suspension components include a plurality of shock absorbers 110. In yet another embodiment the suspension components comprise a combination of air springs 108 and shock absorbers 110.

The brake system 56 includes at least a brake pedal 112 and stop lamp switch 114 that facilitates detecting a hard brake event, in addition to other typical brake system components (not shown). Wheel speed sensors 115 coupled to the ABS 52 are used to determine deceleration of the vehicle. Alternatively, an accelerometer 116 is also coupled to the ABS 52 to provide deceleration information thereto to facilitate detection of a hard brake event.

The memory 102 stores a preset hard brake threshold 118. The hard brake threshold may be stored in memory a priori, received over a communication link, identified or received by any suitable identification means. According to one example, the preset hard brake threshold is a deceleration threshold value. In another example, the hard brake threshold is a pressure threshold value. For instance, the pressure threshold value can be a pressure value of, e.g., about 20 psi to 80 psi indicating the driver depressed the brake pedal. The memory also stores a load determination module 120 that is executed by the processor to determine a low or weight on one or more axles of the common set and/or the entire vehicle. In one embodiment, the load on a single axle is determined by the load determination module 120. In another embodiment the load across a common set (e.g. a double or triple axle or the like) is determined. In another embodiment the total vehicle load is determined by summing the load on all axles of the vehicle. Axle load can be determined, for example, via on or more sensors or scales on each axle or wheel, or by any other suitable sensing means.

A hard brake threshold adjustment module 122 is stored in the memory 102 and executed by the processor 54 to adjust the preset hard brake threshold as a function of the load determined for the one or more axles. When the hard brake threshold is a pressure threshold, the smaller the load on the axle or axle set, the lower the hard brake threshold is set. In the case where the hard brake threshold is a deceleration threshold, the deceleration threshold need not be changed based on the pressure or load. A hard brake detection module 124 detects a hard brake event by comparing a detected event such as brake pedal pressure sensed at the brake pedal 112, deceleration as determined by the accelerometer 116, or the like to the hard brake threshold. In one embodiment, detecting the hard brake event comprises determining that the vehicle is decelerating at a rate greater than the deceleration threshold value. In another embodiment, detecting a hard brake event comprises determining that an amount of pressure applied the brake pedal is greater than the pressure threshold value. In yet another embodiment, detecting hard brake event comprises detecting a brake pressure input or trigger signal.

Upon detection of a hard brake event, a suspension control component (SCC) control output 126 which is part of the ABS controller or a stand alone control device (or other suitable control means) sends a command to the suspension control component 58 to limit load transfer during the hard brake event. That is, load transfer from a dynamically unloaded axle to a more loaded axle is inhibited in response to the command In one embodiment, the command instructs the suspension control component 58 and/or the suspension components 106 themselves to maintain a current amount of rigidity in at least one controlled suspension component. For instance, the suspension control component can be a valve (e.g. a pneumatic valve, and electro-pneumatic valve, etc.) or solenoid that closes in response to the command thereby locking air in the suspension component (e.g., airbags, shock absorbers, etc.) on the dynamically unloaded axle, which in turn maintains rigidity of the suspension component on the dynamically unloaded axle in order to limit load transfer to the more loaded axle and maintain a desired amount of adhesion between wheels on the dynamically unloaded axle and the road.

In another embodiment, the command instructs the one or more variable rate shock absorbers 110 to increase an amount of downward force applied to the dynamically unloaded axle in order to further improve adhesion and limit load transfer to the more loaded axle. In yet another embodiment, the at least one axle is a steering axle, and the controlled suspension component comprises one or more dampened shocks.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A method for reducing load transfer between axles of a common set during braking, comprising:
   via a processor:
   identifying a preset hard brake threshold for a vehicle;
   determining a load on at least one axle of the vehicle;
   detecting a hard brake event; and
   sending a command to a wheel suspension control component (SCC) to limit transfer of suspension load from a dynamically unloaded axle to a more loaded axle;
   wherein the command further comprises an instruction to increase an amount of rigidity in at least one controlled suspension component; and
   wherein the controlled suspension component comprises one or more air springs, and wherein the suspension control component is a valve that closes and locks air in the air springs thereby limiting air transfer between axles and maintaining a current amount of rigidity in the air springs, in response to the command.

2. The method according to claim 1, wherein determining the load on at least one axle of the vehicle comprises determining a total vehicle load by adding together a determined load on each axle of the vehicle.

3. The method according to claim 1, wherein the preset hard brake threshold is a deceleration threshold value, and wherein detecting the hard brake event further comprises determining that the vehicle is decelerating at a rate greater than the deceleration threshold value.

4. The method according to claim 3, wherein the deceleration threshold value is about 0.2 g.

5. The method according to claim 1, wherein the hard brake threshold is a pressure threshold value, wherein the preset hard brake threshold is adjusted as a function of the determined load, and wherein detecting the hard brake event further comprises determining that an amount of pressure detected at the brake pedal is greater than the pressure threshold value.

6. The method according to claim 1, wherein the controlled suspension component comprises one or more variable rate shock absorbers, and wherein the command instructs the one or more variable rate shock absorbers to increase an amount of downward force applied to the dynamically unloaded axle.

7. The method according to claim 1, wherein the at least one axle is a steering axle, and wherein the controlled suspension component comprises one or more dampened shocks.

8. The method according to claim 7, wherein detection of the hard brake event comprises detecting a stop lamp switch input.

9. A processor configured to reduce load transfer between axles of a common set during braking, wherein the processor is configured to:
   identify a preset hard brake threshold for a vehicle;
   determine a load on at least one axle of the vehicle;
   detect a hard brake event; and
   send a command to a wheel suspension control component (SCC) to limit transfer of suspension load from a dynamically unloaded axle to a more loaded axle
   wherein the command comprises an instruction to increase an amount of rigidity in at least one controlled suspension component; and
   wherein the controlled suspension component comprises one or more air springs, and wherein the suspension control component is a valve that is instructed by the command to close and lock air in the air springs thereby limiting air transfer between axles and maintaining a current amount of rigidity in the air springs.

10. The processor according to claim 9, wherein the preset hard brake threshold is a deceleration threshold value, and wherein detecting the hard brake event further comprises determining that the vehicle is decelerating at a rate greater than the deceleration threshold value.

11. The processor according to claim 10, wherein the deceleration threshold value is about 0.2 g.

12. The processor according to claim 9, wherein the hard brake threshold is a pressure threshold value, and wherein the processor is further configured to:
   adjust the preset hard brake threshold as a function of the determined load; and
   determine that an amount of pressure detected at the brake pedal is greater than the pressure threshold value.

13. The processor according to claim 9, wherein the controlled suspension component comprises one or more variable rate shock absorbers, and wherein the command instructs the one or more variable rate shock absorbers to increase an amount of downward force applied to the dynamically unloaded axle.

14. The processor according to claim 13, wherein the processor is further configured to detect the hard brake event by detecting a stop lamp switch input.

15. A system that facilitates reducing load transfer between axles of a common set of axles on a vehicle during a hard brake event, comprising:
   a suspension control component configured to control one or more suspension components during the hard brake event;
   a processor configured to:
   identify a preset hard brake threshold for the vehicle;
   determine a load on at least one axle of the vehicle;
   detect a hard brake event; and
   send a command to a wheel suspension control component (SCC) to limit transfer of suspension load from a dynamically unloaded axle to a more loaded axle;
   wherein the command comprises an instruction to increase an amount of rigidity in at least one controlled suspension component; and
   wherein the controlled suspension component comprises one or more air springs, and wherein the suspension control component is a normally-open valve that is instructed by the command to close and lock air in the air springs thereby limiting air transfer between axles and increasing an amount of rigidity in the air springs.

16. The system according to claim 15, wherein the preset hard brake threshold is a deceleration threshold value, and wherein detecting the hard brake event further comprises determining that the vehicle is decelerating at a rate greater than the deceleration threshold value.

17. The system according to claim 16, wherein the deceleration threshold value is about 0.2 g.

18. The system according to claim 15, wherein the hard brake threshold is a pressure threshold value, and wherein the processor is further configured to;
   adjust the preset hard brake threshold as a function of the determined load; and
   determine that an amount of pressure detected at the brake pedal is greater than the pressure threshold value.

19. The system according to claim 15, wherein the controlled suspension component comprises one or more variable rate shock absorbers, and wherein the command instructs the one or more variable rate shock absorbers to increase an amount of downward force applied to the dynamically unloaded axle.

20. The system according to claim 19, wherein the processor is further configured to detect the hard brake event by detecting a stop lamp switch input.

21. An apparatus for reducing load transfer between axles of a common set during braking, comprising:
   identification means for identifying a preset hard brake threshold for a vehicle;
   sensing means for determining a load on at least one axle of the vehicle;
   detection means for detecting a hard brake event; and
   control means for sending a command to a wheel suspension control component (SCC) to limit transfer of suspension load from a dynamically unloaded axle to a more loaded axle;
   wherein the command comprises an instruction to increase an amount of rigidity in at least one controlled suspension component; and
   wherein the controlled suspension component comprises one or more air springs, and wherein the suspension control component is a normally-open valve that is instructed by the command to close and lock air in the air springs thereby limiting air transfer between axles and increasing an amount of rigidity in the air springs.

* * * * *